United States Patent
Ozasa et al.

(10) Patent No.: US 12,224,125 B2
(45) Date of Patent: Feb. 11, 2025

(54) FILM CAPACITOR

(71) Applicants: Shizuki Electric Co., Inc., Nishinomiya (JP); Murata Manufacturing Co., Ltd., Nagaokakyo (JP)

(72) Inventors: Senichi Ozasa, Nishinomiya (JP); Tomomichi Ichikawa, Nagaokakyo (JP)

(73) Assignees: SHIZUKI ELECTRIC CO., INC., Nishinomiya (JP); MURATA MANUFACTURING CO., LTD., Nagaokakyo (JP)

( * ) Notice: Subject to any disclaimer, the term of this patent is extended or adjusted under 35 U.S.C. 154(b) by 152 days.

(21) Appl. No.: 18/188,813

(22) Filed: Mar. 23, 2023

(65) Prior Publication Data
US 2023/0230769 A1 Jul. 20, 2023

Related U.S. Application Data

(63) Continuation of application No. PCT/JP2021/034556, filed on Sep. 21, 2021.

(30) Foreign Application Priority Data

Sep. 23, 2020 (JP) ................ 2020-158884

(51) Int. Cl.
*H01G 4/14* (2006.01)
*C08G 18/58* (2006.01)
*C08G 18/76* (2006.01)
*H01G 4/32* (2006.01)

(52) U.S. Cl.
CPC ............ *H01G 4/14* (2013.01); *C08G 18/58* (2013.01); *C08G 18/7671* (2013.01); *H01G 4/32* (2013.01)

(58) Field of Classification Search
None
See application file for complete search history.

(56) References Cited

U.S. PATENT DOCUMENTS

| 2019/0071534 A1* | 3/2019 | Hattori ................. D04H 1/728 |
| 2020/0211772 A1* | 7/2020 | Ichikawa ............. B32B 15/095 |
| 2021/0366656 A1* | 11/2021 | Furuhashi ............. H01G 4/18 |
| 2022/0169779 A1* | 6/2022 | Noda .................... A61L 27/60 |

(Continued)

FOREIGN PATENT DOCUMENTS

| JP | H02191624 A | 7/1990 |
| JP | H05251266 A | 9/1993 |

(Continued)

OTHER PUBLICATIONS

International Search Report in PCT/JP2021/034556, mailed Dec. 14, 2021, 3 pages.

*Primary Examiner* — Dion R. Ferguson
(74) *Attorney, Agent, or Firm* — ArentFox Schiff LLP (57) ABSTRACT

A film capacitor that includes a dielectric resin film made of a thermosetting urethane resin; and a metal layer on at least one surface of the dielectric resin film, wherein the dielectric resin film contains at least an isocyanate group and a carbonyl group, and a ratio of a first absorption peak intensity of the isocyanate group in a wave number range of 2200 $cm^{-1}$ to 2350 $cm^{-1}$ to a second absorption peak intensity of the carbonyl group in a wave number range of 1650 $cm^{-1}$ to 1800 $cm^{-1}$ is 0.08 to 1.15.

12 Claims, 2 Drawing Sheets

(56) References Cited

U.S. PATENT DOCUMENTS

| | | | |
|---|---|---|---|
| 2023/0230769 A1* | 7/2023 | Ozasa | H01B 3/302 |
| | | | 361/323 |
| 2024/0321522 A1* | 9/2024 | Akiba | H01G 4/32 |

FOREIGN PATENT DOCUMENTS

| | | | |
|---|---|---|---|
| JP | 2004363431 A | 12/2004 | |
| WO | 2017175511 A1 | 10/2017 | |
| WO | 2019097751 A1 | 5/2019 | |
| WO | 2020166392 A1 | 8/2020 | |

* cited by examiner

FILM CAPACITOR

CROSS REFERENCE TO RELATED APPLICATIONS

The present application is a continuation of International application No. PCT/JP2021/034556, filed Sep. 21, 2021, which claims priority to Japanese Patent Application No. 2020-158884, filed Sep. 23, 2020, the entire contents of each of which are incorporated herein by reference.

FIELD OF THE INVENTION

The present invention relates to a film capacitor.

BACKGROUND OF THE INVENTION

One type of capacitors is a film capacitor that has a structure including a flexible resin film as a dielectric, a first counter electrode, and a second counter electrode opposing the first counter electrode across the resin film. Usually, a film capacitor has a substantially cylindrical shape obtained by winding a resin film serving as the dielectric. The cylinder has a first end surface and a second end surface opposing each other and including a first external terminal electrode and a second external terminal electrode, respectively. The first counter electrode is electrically connected to the first external terminal electrode, and the second counter electrode is electrically connected to the second external terminal electrode.

Such a film capacitor is disclosed in WO 2017/175511 (Patent Literature 1). The film capacitor includes a dielectric resin film, a first counter electrode, and second counter electrode opposing the first counter electrode across the dielectric resin film, wherein the dielectric resin film is a capacitor film made of a crosslinked product of a first organic material and a second organic material, the second organic material is a polyisocyanate containing multiple isocyanate groups, and the first organic material contains multiple hydroxy groups and a branched structure.

According to Patent Literature 1, examples of the first organic material include phenoxy resins such as a high molecular weight bisphenol A epoxy resin and polyols such as polyether polyols and polyester polyols, and examples of the second organic material include polyisocyanates such as diphenylmethane diisocyanate (MDI) and tolylene diisocyanate (TDI).

Patent Literature 1 discloses that the weight proportion of the first organic material (phenoxy resin or polyol) is preferably higher than the weight proportion of the second organic material (polyisocyanate).

Patent Literature 1 also discloses that the amount of residue of hydroxy groups is preferably larger than the amount of residue of isocyanate groups.

Patent Literature 1 still also discloses that the counter electrodes of the film capacitor are made of, for example, vapor-deposited aluminum films on dielectric resin film surfaces. A first dielectric resin film with a counter electrode and a second dielectric resin film with a counter electrode are laminated and wound together to obtain a capacitor element, and zinc, for example, is thermally sprayed to the ends of the capacitor element to form external terminal electrodes.

SUMMARY OF THE INVENTION

Film capacitors are also used as inverter smoothing capacitors for electric vehicles. Having a higher energy density, film capacitors for use in such applications are often subjected to long-term voltage application in a higher temperature usage environment than before.

In film capacitors for use in such applications, vapor-deposited electrodes such as aluminum films may be gradually oxidized, increasing the equivalent series resistance (ESR) of the film capacitors. In particular, the vapor-deposited electrodes on the positive electrode side are more prone to oxidation because these electrodes are electrochemically reactive with hydroxide ions derived from the surrounding moisture.

Further, oxidation progression of the vapor-deposited electrodes causes loss of electrode function, reducing the capacitance.

Film capacitors, such as the one disclosed in Patent Literature 1, have heat resistance and thus can be used in an environment higher than 125° C. This has brought up an issue associated with oxidation progression of the vapor-deposited electrodes.

In film capacitors, such as the one disclosed in Patent Literature 1, dielectric resin films are made of a urethane-based material obtained by polymerization of a hydroxy group and an isocyanate group. Dielectric resin films made of a urethane-based material tend to absorb moisture in the environment because the urethane-based material is highly hygroscopic. When the dielectric resin films absorb moisture in the environment, the vapor-deposited electrodes on the dielectric resin films are more easily oxidized by the moisture. Thus, the dielectric resin films being made of a urethane-based material is another factor that brings up an issue associated with oxidation progression of the vapor-deposited electrodes.

Thus, as disclosed in Patent Literature 1, the following two phenomena easily occur simultaneously in the film capacitor including the dielectric resin films made of a thermosetting urethane resin: easy oxidation of the vapor-deposited electrodes due to use in a high temperature environment; and easy oxidation of the vapor-deposited electrodes due to absorption of moisture in the environment. This has brought up issues associated with oxidation progression of the vapor-deposited electrodes and a consequent increase in ESR.

The present invention was made to solve the above issues and aims to provide a film capacitor including metal layers as electrodes less likely to be oxidized even after long-term voltage application to the film capacitor in a high temperature usage environment.

A film capacitor of the present invention includes a dielectric resin film made of a thermosetting urethane resin; and a metal layer on at least one surface of the dielectric resin film, wherein the dielectric resin film contains at least an isocyanate group and a carbonyl group, and a ratio of a first absorption peak intensity of the isocyanate group in a wave number range of 2200 $cm^{-1}$ to 2350 $cm^{-1}$ to a second absorption peak intensity of the carbonyl group in a wave number range of 1650 $cm^{-1}$ to 1800 $cm^{-1}$ is 0.08 to 1.15.

The present invention provides a film capacitor including metal layers as electrodes less likely to be oxidized even after long-term voltage application to the film capacitor in a high temperature usage environment.

DETAILED DESCRIPTION OF THE PREFERRED EMBODIMENTS

The film capacitor of the present invention is described below.

The present invention is not limited to the following features and may be suitably modified without departing from the gist of the present invention.

Combinations of two or more preferred features described in the following are also within the scope of the present invention.

Film Capacitor

The film capacitor of the present invention includes a dielectric resin film and a metal layer provided on at least one surface of the dielectric resin film.

For example, the film capacitor of the present invention may have a pillar shape having an oblong cross section, and may include external terminal electrodes formed by, for example, metal spraying (metallikon) at both ends of the pillar shape in the central axis direction.

Hereafter, a film capacitor according to an embodiment of the present invention is described taking as an example a wound film capacitor including a first dielectric resin film provided with a first metal layer and a second dielectric resin film provided with a second metal layer, the first and second dielectric resin films being wound in a laminated state. Alternatively, the film capacitor of the present invention may be, for example, a laminate film capacitor including a first dielectric resin film provided with a first metal layer and a second dielectric resin film provided with a second metal layer, the first and second dielectric resin films being laminated.

Still alternatively, the film capacitor of the present invention may be, for example, a film capacitor including a first dielectric resin film provided with a first metal layer and a second metal layer respectively on a front surface and a rear surface thereof, and a second dielectric resin film not provided with metal layers, the first and second dielectric resin films being wound or laminated.

Figure 1:
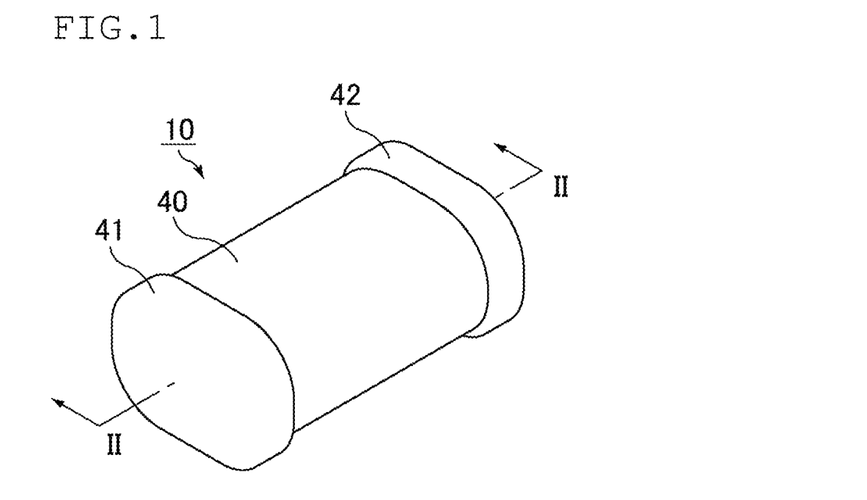
FIG. 1 is a schematic perspective view of an example of a film capacitor of the present invention.
Figure 2:
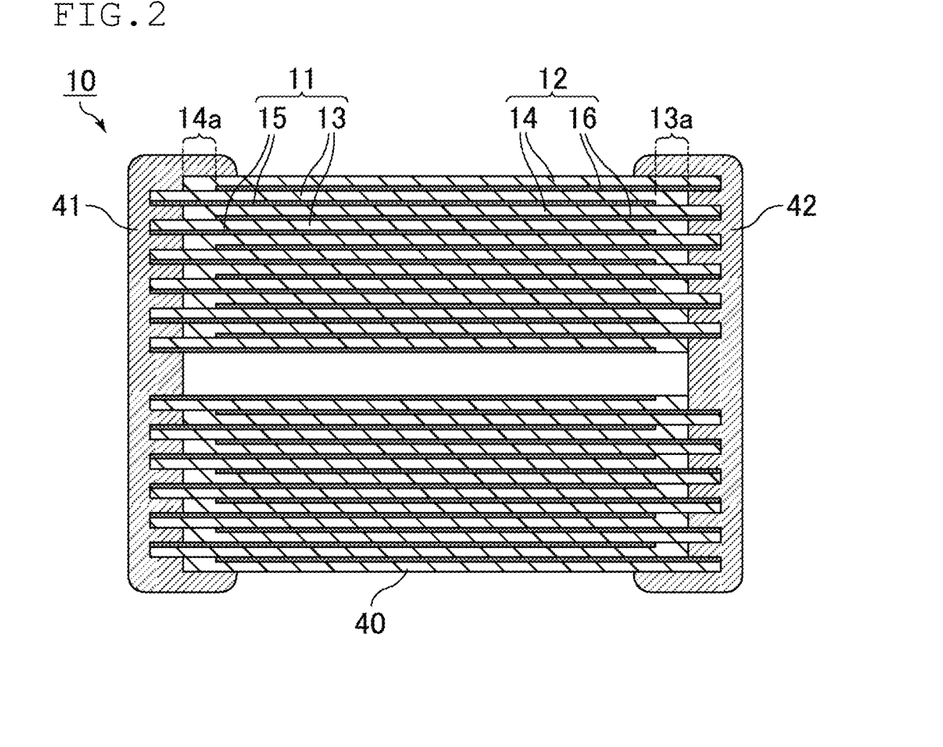
FIG. 2 is a cross-sectional view of the film capacitor shown in FIG. 1 taken along line II-II.

FIG. 1 is a schematic perspective view of an example of a film capacitor of the present invention. FIG. 2 is a cross-sectional view of the film capacitor shown in FIG. 1 taken along line II-II.

A film capacitor 10 shown in FIG. 1 and FIG. 2 is a wound film capacitor and includes a wound body 40 of metallized films including a first metallized film 11 and a second metallized film 12 that are wound in a laminated state, and a first external terminal electrode 41 and a second external terminal electrode 42 connected to respective ends of the wound body 40 of the metallized films. As shown in FIG. 2, the first metallized film 11 includes a first dielectric resin film 13 and a first metal layer (counter electrode) 15 on one surface of the first dielectric resin film 13, while the second metallized film 12 includes a second dielectric resin film 14 and a second metal layer (counter electrode) 16 on one surface of the second dielectric resin film 14.

As shown in FIG. 2, the first metal layer 15 and the second metal layer 16 are opposite each other across the first dielectric resin film 13 or the second dielectric resin film 14. The first metal layer 15 is electrically connected to the first external terminal electrode 41, while the second metal layer 16 is electrically connected to the second external terminal electrode 42.

The first dielectric resin film 13 and the second dielectric resin film 14 may have different structures, but preferably have the same structure. Preferred structures of the first dielectric resin film 13 and the second dielectric resin film 14 will be described later.

The first metal layer 15 is provided on one surface of the first dielectric resin film 13 such that it extends to a first edge but not to a second edge. This results in a strip-like first insulating portion 13a on the second edge on one surface of the first dielectric resin film 13.

The second metal layer 16 is provided on one surface of the second dielectric resin film 14 such that it extends to the second edge but not to the first edge. This results in a strip-like second insulating portion 14a on the first edge on one surface of the second dielectric resin film 14.

The first metal layer 15 and the second metal layer 16 may be aluminum layers, for example.

Figure 3:
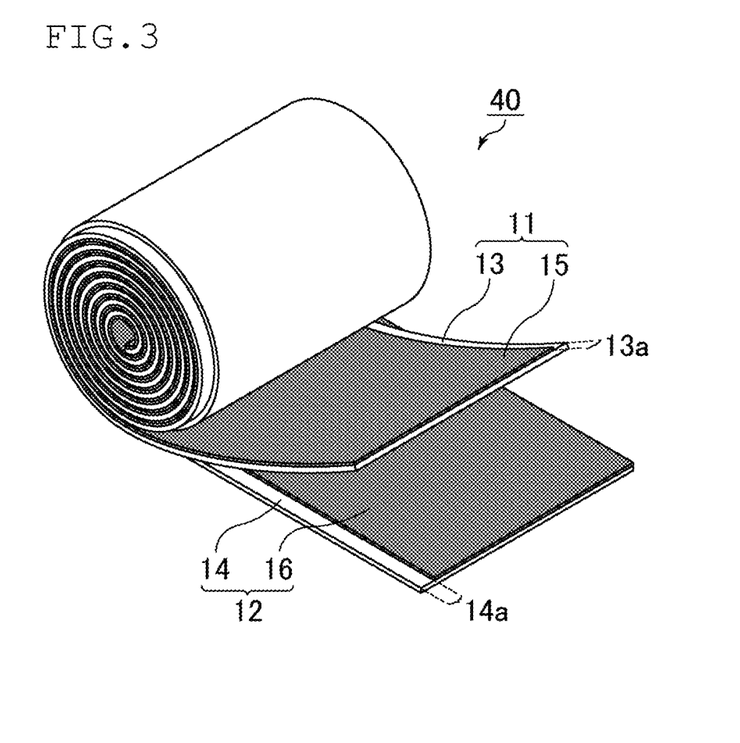
FIG. 3 is a schematic perspective view of an example of a wound body of metallized films defining the film capacitor shown in FIG. 1 and FIG. 2.

FIG. 3 is a schematic perspective view of an example of a wound body of metallized films defining the film capacitor shown in FIG. 1 and FIG. 2.

As shown in FIG. 2 and FIG. 3, the first dielectric resin film 13 and the second dielectric resin film 14 are laminated while they are shifted from each other in a width direction (in FIG. 2, a left-to-right direction) such that one end of the first metal layer 15 which extends to the edge of the first dielectric resin film 13 and one end of the second metal layer 16 which extends to the edge of the second dielectric resin film 14 are exposed from the laminated films. The first dielectric resin film 13 and the second dielectric resin film 14 are wound in a laminated state into the wound body 40 of the metallized films. Thus, the first metal layer 15 and the second metal layer 16 are in a laminated state while they maintain a state in which one end of the first metal layer 15 and one end of the second metal layer 16 are exposed.

In FIG. 2 and FIG. 3, the first dielectric resin film 13 and the second dielectric resin film 14 are wound such that the second dielectric resin film 14 is outside the first dielectric resin film 13 and that the first metal layer 15 and the second metal layer 16 face inside.

The first external terminal electrode 41 and the second external terminal electrode 42 are formed by, for example, thermal spraying of zinc onto the respective end surfaces of the wound body 40 of the metallized films obtained as described above. The first external terminal electrode 41 is in contact with the exposed end of the first metal layer 15 and is thereby electrically connected to the first metal layer 15. The second external terminal electrode 42 is in contact with the exposed end of the second metal layer 16 and is thereby electrically connected to the second metal layer 16.

In the film capacitor of the present invention, preferably, the wound body of the metallized films is pressed into a flat shape having an oval or oblong cross section so as to have a more compact shape than that having a perfectly circular cross section. The film capacitor of the present invention may include a cylindrical winding shaft. The winding shaft is arranged on the central axis of the wound metallized films and serves as a spool for winding the metallized films.

Metal Layers

In the film capacitor of the present invention, examples of the metal contained in the metal layers include aluminum (Al), titanium (Ti), zinc (Zn), magnesium (Mg), tin (Sn), and nickel (Ni).

In the film capacitor of the present invention, the metal layers are formed by, for example, vapor deposition of any of the above metals on the dielectric resin films.

In the film capacitor of the present invention, the metal layers each may have any thickness, such as 5 nm to 40 nm.

The thickness of each metal layer can be determined by observation of a cross section obtained by cutting the dielectric resin film provided with the metal layer in the thickness direction using an electron microscope such as a field emission scanning electron microscope (FE-SEM).

In the film capacitor of the present invention, each metal layer is preferably provided with a fuse portion.

The fuse portion refers to a portion interconnecting electrode portions obtained by dividing the metal layers, which serve as counter electrodes, into multiple portions. The metal layer including a fuse portion may have any pattern, such as an electrode pattern disclosed in JP 2004-363431 A or JP H05-251266 A.

Dielectric Resin Films

In the film capacitor of the present invention, the dielectric resin films are made of a thermosetting urethane resin and contain at least an isocyanate group and a carbonyl group. A ratio of the absorption peak intensity of the isocyanate group detected in a wave number range of 2200 $cm^{-1}$ to 2350 $cm^{-1}$ to the absorption peak intensity of the carbonyl group detected in a wave number range of 1650 $cm^{-1}$ to 1800 $cm^{-1}$ (absorption peak intensity of isocyanate group/absorption peak intensity of carbonyl group) is 0.08 to 1.15. The ratio of the absorption peak intensity of the isocyanate group to the absorption peak intensity of the carbonyl group is preferably 0.1 to 1.0, more preferably 0.2 to 0.8.

In the film capacitor of the present invention, when the ratio of the absorption peak intensity of the isocyanate group to the absorption peak intensity of the carbonyl group is in the above range, the moisture and the isocyanate group preferentially react with each other and are consumed upon absorption of the moisture by the dielectric resin films of the film capacitor of the present invention, so that oxidation of the metal layers due to the moisture can be reduced or prevented.

Based on this principle, oxidation of the metal layers as the electrodes can be reduced or prevented even after long-term voltage application to the film capacitor of the present invention in a high temperature usage environment.

As a result, the equivalent series resistance (ESR) of the capacitor is less likely to increase even after long-term voltage application to the film capacitor of the present invention in a high temperature usage environment. In other words, the film capacitor of the present invention has high temperature resistance.

As described above, oxidation of the metal layers as the electrodes can be reduced or prevented even after long-term voltage application in a high temperature usage environment, so that the film capacitor of the present invention is less likely to undergo a reduction in capacitance.

A ratio of the absorption peak intensity of the isocyanate group to the absorption peak intensity of the carbonyl group of less than 0.08 tends to increase the equivalent series resistance and reduce the capacitance because the number of isocyanate groups present is small.

In contrast, the number of isocyanate groups present is high when the ratio of the absorption peak intensity of the isocyanate group to the absorption peak intensity of the carbonyl group is more than 1.15. Thus, the dielectric resin films are substantially in an uncured state, so that the dielectric resin films are less likely to exert their functions. This resultantly tends to increase the equivalent series resistance and reduce the capacitance.

The term "absorption peak intensity" as used herein refers to a value calculated as follows.

First, the infrared absorption spectrum of each dielectric resin film is measured by attenuated total reflection (ATR) using Fourier-transform infrared spectrometer (FT-IR).

Next, assuming that an absorption band observed in a predetermined wave number region is attributed to a predetermined functional group, a baseline is drawn on both sides of each peak, and a value of the intensity from the baseline to the top of the peak is taken as the "absorption peak intensity" of the functional group.

In the film capacitor of the present invention, preferably, the dielectric resin films each have a moisture content of 0.4 wt % or less.

When the dielectric resin films each have a moisture content of 0.4 wt % or less, the moisture content is sufficiently low. Thus, a reduction in unreacted isocyanate groups due to reaction of the moisture with isocyanate groups in the dielectric resin films can be reduced or prevented. As a result, oxidation of the metal layers can be significantly reduced or prevented.

In the film capacitor of the present invention, preferably, the dielectric resin films each have a moisture content of 0.01 wt % or more.

When the dielectric resin films each have a moisture content of less than 0.01 wt %, the dielectric resin films are likely to be brittle.

Herein, the "moisture content of the dielectric resin film" is a value measured by heating at 130° C. in accordance with the hydride reaction method (ISO 15512:2019 as Method E).

In the film capacitor of the present invention, the dielectric resin films may have any thickness, but the dielectric resin films tend to be brittle if they are too thin. Thus, the thickness of each dielectric resin film is preferably 1 μm or more, more preferably 3 μm or more. The films that are too thick are susceptible to defects such as cracking during film formation. Thus, the thickness of each dielectric resin film is preferably 10 μm or less, more preferably 5 μm or less.

The thickness of each dielectric resin film means the thickness of each dielectric resin film alone excluding the thicknesses of the metal layers. The thickness of each dielectric resin film can be measured using an optical film thickness gauge.

In the film capacitor of the present invention, the dielectric resin films are made of, for example, a cured product of a first organic material containing hydroxy groups (OH groups) and a second organic material containing isocyanate groups (NCO groups).

Specifically, the dielectric resin films are made of, for example, a cured product obtained by reaction of hydroxy groups in the first organic material with isocyanate groups in the second organic material.

The first organic material may be an organic polymer containing a hydroxyl group and a benzene ring in the repeating unit. Examples of such a compound include phenoxy resins.

Preferred phenoxy resins are, for example, bisphenol A phenoxy resin, bisphenol F phenoxy resin, and the like.

Examples of the second organic material include diphenylmethane diisocyanate (MDI), tolylene diisocyanate (TDI), and hexamethylene diisocyanate (HDI). MDI and TDI are preferred among these compounds. Examples of the second organic material may also include modified polyisocyanates of these compounds. These examples may be used in combination.

In the film capacitor of the present invention, the isocyanate groups in the dielectric resin films may be those derived from the second organic material.

In the film capacitor of the present invention, the dielectric resin films may contain additives to impart other functions thereto. For example, adding a leveling agent can impart smoothness. Additives may be materials containing functional groups that react with hydroxy groups and/or isocyanate groups and form a part of a crosslinked structure of a cured product. Examples of such materials include resins containing at least one functional group selected from the group consisting of an epoxy group, a silanol group, and a carboxy group.

The film capacitor of the present invention has a CR value of preferably 250 Ω·F or higher, more preferably 500 Ω·F or higher, the CR value being the product of the capacitance of the film capacitor and the insulation resistance thereof measured after being left in an atmosphere at 125° C. for one hour and subsequently subjected to voltage application of 150 V/μm for one minute.

Capacitors having a CR value of 250 Ω·F or higher under the above conditions are considered to have high temperature resistance.

The CR value is preferably 5000 Ω·F or lower.

Producing film capacitors having a CR value higher than 5000 Ω·F is too costly, resulting in low production efficiency.

Method of Producing Film Capacitor

The following will describe an example of the method of producing the film capacitor of the present invention.

The dielectric resin films of the film capacitor of the present invention can be produced by forming a resin solution containing a first organic material containing hydroxy groups and a second organic material containing isocyanate groups into a film shape and then heating the resin solution for curing.

Here, the amount of unreacted isocyanate groups can be controlled by adjusting heat treatment conditions such as reaction temperature and reaction time and/or adjusting the ratio of moles between hydroxy groups in the first organic material and isocyanate groups in the second organic material. Thus, the ratio of the absorption peak intensity of the isocyanate group to the absorption peak intensity of the carbonyl group (absorption peak intensity of isocyanate group/absorption peak intensity of carbonyl group) of each dielectric resin film obtained can be adjusted to 0.08 to 1.15.

Next, a metal layer is formed on one surface of the dielectric resin film produced, whereby a metallized film is obtained. The metal layer can be formed by a method such as vapor deposition.

Here, the metal layer is formed such that a strip-like insulating portion is formed on one edge of one surface of the dielectric resin film.

Next, two metallized films each including a dielectric resin film and a metal layer on one surface of the dielectric resin film are prepared. One of the two metallized films is rotated 180 degrees about an axis in the lamination direction so that the insulating portions are alternately positioned. The sheets are laminated while they are shifted from each other by a predetermined distance in a width direction and then wound together to obtain a capacitor element. If necessary, the laminate may be formed into an oval cylindrical shape by being pressed in the direction perpendicular to the width direction.

Subsequently, external terminal electrodes are formed on the end surfaces of the laminate. Thus, a film capacitor as shown in FIG. 1 is obtained. The external terminal electrodes on the end surfaces of the laminate may be formed by thermal spraying, for example.

EXAMPLES

Examples that more specifically disclose the film capacitor of the present invention are described below. The present invention is not limited to these examples.

Example 1-1, Example 1-2, Comparative Example 1-1, and Comparative Example 1-2

A high molecular weight bisphenol A phenoxy resin and difunctional isocyanate (MDI) were mixed such that the number of moles of hydroxy groups in the bisphenol A phenoxy resin was substantially equal to the number of moles of isocyanate groups in the difunctional isocyanate. The mixture was thinly applied to a substrate film and dried to obtain a resin film as a dielectric resin film. Aluminum was vapor-deposited such that a strip-like insulating portion was formed on one edge of the dielectric resin film, whereby a metal layer was formed, followed by removal of the substrate and thermal curing. Thermal curing was suitably adjusted at a temperature of 100° C. to 180° C. with a duration of 2 hours to 50 hours. Thus, 3-μm-thick dielectric resin films each provided with a metal layer according to Production Example 1-1, Production Example 1-2, Production Example 1-3, and Production Example 1-4 were produced.

The ratio of the absorption peak intensity of the isocyanate group to the absorption peak intensity of the carbonyl group (absorption peak intensity of isocyanate group/absorption peak intensity of carbonyl group) of each dielectric resin film was measured by the following method. Table 1 shows the values obtained.

Measurement of Functional Group Absorption Peak Intensity

Each dielectric resin film was subjected to ATR measurement using a Fourier-transform infrared spectrometer. The wave number range was 4000 $cm^{-1}$ to 500 $cm^{-1}$. "FT/IR-4100 ST" available from JASCO Corporation was used for the measurement. The number of scans was 64 and the resolution was 4 $cm^{-1}$.

Subsequently, a calculation was performed to determine the ratio of the absorption peak intensity of the isocyanate group detected in a wave number range of 2200 $cm^{-1}$ to 2350 $cm^{-1}$ to the absorption peak intensity of the carbonyl group detected in a wave number range of 1650 $cm^{-1}$ to 1800 $cm^{-1}$ (absorption peak intensity of isocyanate group/absorption peak intensity of carbonyl group).

Next, for each of Production Example 1-1, Production Example 1-2, Production Example 1-3, and Production Example 1-4, two dielectric resin films each provided with a metal layer were prepared. These dielectric resin films were laminated while one of them was rotated 180 degrees about an axis in the lamination direction so that the insulating portions were alternately positioned. Then, these dielectric resin films were wound together to obtain a capacitor element. Zinc was thermally sprayed to the ends of the capacitor element to form external terminal electrodes. Lead wires were connected to the external terminal electrodes. The capacitor element was inserted into a polyphenylene sulfide (PPS) case, and the case was filled with an epoxy resin to enclose of the capacitor element.

Film capacitors according to Comparative Example 1-1, Example 1-1, Example 1-2, and Comparative Example 1-2 were produced as described above.

The film capacitor according to Comparative Example 1-1 includes the dielectric resin films according to Production Example 1-1.

The film capacitor according to Example 1-1 includes the dielectric resin films according to Production Example 1-2.

The film capacitor according to Example 1-2 includes the dielectric resin films according to Production Example 1-3.

The film capacitors were comprehensively evaluated according to the following criteria based on "Measurement of CR Value" and "Measurement of Rate of ESR Increase" described above.

Excellent: The CR value is 100 Ω·F or higher, and the rate of ESR increase is 15% or less.

Good: The CR value is less than 100 Ω·F, and the rate of ESR increase is 15% or less.

Fair: The CR value is 100 Ω·F or higher, and the rate of ESR increase is more than 15%

Poor: The CR value is less than 100 Ω·F, and the rate of ESR increase is more than 15%.

TABLE 1

| | Type of dielectric resin film | Isocyanate group absorption peak intensity/carbonyl group absorption peak intensity | CR value (Ω · F.) | Evaluation of CR value | Rate of ESR increase (%) | Evaluation of Rate of ESR increase | Comprehensive evaluation |
|---|---|---|---|---|---|---|---|
| Comparative Example 1-1 | Production Example 1-1 | 0.05 | 60 | Poor | 42 | Poor | Poor |
| Example 1-1 | Production Example 1-2 | 0.08 | 250 | Good | 15 | Good | Excellent |
| Example 1-2 | Production Example 1-3 | 1.15 | 1000 | Good | 7 | Good | Excellent |
| Comparative Example 1-2 | Production Example 1-4 | 1.50 | 30 | Poor | 32 | Poor | Poor |

The film capacitor according to Comparative Example 1-2 includes the dielectric resin films according to Production Example 1-4.

Measurement of CR Value

The capacitance of each film capacitor was measured under the measurement conditions based on the standard (JIS C 5101-1 1998) using a capacitance meter (LCR meter).

The insulation resistance value of each film capacitor after being left in an atmosphere at 125° C. for one hour and subsequently subjected to voltage application of 150 V/μm (150 V per μm thickness of the dielectric resin film) for one minute was also measured. The insulation resistance value was measured with an insulation resistance tester (model: DSM-8104; manufacturer: Hioki E.E. Corporation). Then, the CR value expressed as the product of the capacitance value and the insulation resistance value was calculated. Table 1 shows the results.

The film capacitors were evaluated according to the following criteria based on the CR values.

Good: The CR value is 100 Ω·F or higher.

Poor: CR value is less than 100 Ω·F.

Measurement of Rate of ESR Increase

Each film capacitor was subjected to a 2000-hour high temperature load test at a temperature of 125° C. with a voltage of 200 V/μm (200 V per μm thickness of the dielectric resin film) to measure the rate of ESR increase before and after the test. The criteria are as follows.

Table 1 shows the results. The ESR was measured with an LCR meter (model: E4980A; manufacturer: Agilent Technologies).

The film capacitors were evaluated according to the following criteria based on the values of the rate of ESR increase.

Good: The rate of ESR increase is 15% or less.

Poor: The rate of ESR increase is more than 15%.

As shown in Table 1, the results found that oxidation of the vapor-deposited electrodes was reduced or prevented and the ESR was less likely to increase even after long-term voltage application at a high temperature, as long as the dielectric resin films had a ratio of absorption peak intensity of the isocyanate group to absorption peak intensity of the carbonyl group (absorption peak intensity of isocyanate group/absorption peak intensity of carbonyl group) of 0.08 to 1.15.

The film capacitors according to Example 1-1 and Example 1-2 configured as described above each had a CR value of 250 Ω·F or higher.

Example 2-1, Example 2-2, Comparative Example 2-1, and Comparative Example 2-2

A high molecular weight bisphenol A phenoxy resin and a TDI-trifunctional trimethylolpropane (TMP) adduct were mixed such that the number of moles of hydroxy groups in the bisphenol A phenoxy resin was substantially equal to the number of moles of isocyanate groups in the TDI adduct. The mixture was thinly applied to a substrate film and dried to obtain a resin film as a dielectric resin film. Aluminum was vapor-deposited such that a strip-like insulating portion was formed on one edge of the dielectric resin film, whereby a metal layer was formed, followed by removal of the substrate and thermal curing. Thermal curing was suitably adjusted at a temperature of 100° C. to 180° C. with a duration of 2 hours to 50 hours. Thus, 5-μm-thick dielectric resin films each provided with a metal layer according to Production Example 2-1, Production Example 2-2, Production Example 2-3, and Production Example 2-4 were produced.

The ratio of the absorption peak intensity of the isocyanate group to the absorption peak intensity of the carbonyl group (absorption peak intensity of isocyanate group/absorption peak intensity of carbonyl group) of each dielectric resin film was measured by the following method. Table 2 shows the values obtained.

The absorption peak intensity of each functional group was measured similarly as in "Measurement of Functional Group Absorption Peak Intensity" described above.

Next, for each of Production Example 2-1, Production Example 2-2, Production Example 2-3, and Production Example 2-4, two dielectric resin films each provided with a metal layer were prepared. These dielectric resin films were laminated while one of them was rotated 180 degrees about an axis in the lamination direction so that the insulating portions were alternately positioned. Then, these dielectric resin films were wound together to obtain a capacitor element. Zinc was thermally sprayed to the ends of the capacitor element to form external terminal electrodes. Lead wires were connected to the external terminal electrodes. The capacitor element was inserted into a PPS case, and the case was filled with an epoxy resin to enclose the capacitor element.

Film capacitors according to Comparative Example 2-1, Example 2-1, Example 2-2, and Comparative Example 2-2 were produced as described above.

The film capacitor according to Comparative Example 2-1 includes the dielectric resin films according to Production Example 2-1.

The film capacitor according to Example 2-1 includes the dielectric resin films according to Production Example 2-2.

The film capacitor according to Example 2-2 include the dielectric resin films according to Production Example 2-3.

The film capacitor according to Comparative Example 2-2 includes the dielectric resin films according to Production Example 2-4.

The CR value and the rate of ESR increase of each film capacitor were measured similarly as in "Measurement of CR value" and "Measurement of Rate of ESR Increase" described above. Table 2 shows the results.

Example 3-1, Example 3-2, Comparative Example 3-1, and Comparative Example 3-2

A high molecular weight bisphenol A phenoxy resin and difunctional isocyanate (MDI) were mixed such that the ratio of moles of hydroxy groups in the bisphenol A phenoxy resin to moles of isocyanate groups in the difunctional isocyanate (hydroxy groups/isocyanate groups) was varied at 60/40, 50/50, 40/60, and 30/70 to produce four types of coating solutions. Each coating solution was thinly applied to a substrate film and dried to obtain a resin film as a dielectric resin film. Aluminum was vapor-deposited such that a strip-like insulating portion was formed on one edge of the dielectric resin film, whereby a metal layer was formed, followed by removal of the substrate and thermal curing. Thermal curing was performed at 150° C. for five hours. Thus, 3-μm-thick dielectric resin films each provided with a metal layer according to Production Example 3-1 (hydroxy group/isocyanate group=60/40), Production Example 3-2 (hydroxy groups/isocyanate groups=50/50), Production Example 3-3 (hydroxy groups/isocyanate groups=40/60), and Production Example 3-4 (hydroxy groups/isocyanate groups=30/70) were produced.

The absorption peak intensity of the isocyanate group and the absorption peak intensity of the carbonyl group of each dielectric resin film provided with a metal layer were measured similarly as in "Measurement of Functional Group Absorption Peak Intensity" described above. The ratio of the absorption peak intensity of the isocyanate group to the absorption peak intensity of the carbonyl group (absorption peak intensity of isocyanate group/absorption peak intensity of carbonyl group) was calculated. Table 3 shows the results.

Next, for each of Production Example 3-1, Production Example 3-2, Production Example 3-3, and Production

TABLE 2

| | Type of dielectric resin film | Isocyanate group absorption peak intensity/carbonyl group absorption peak intensity | CR value ($\Omega \cdot F$) | Evaluation of CR value | Rate of ESR increase (%) | Evaluation of Rate of ESR increase | Comprehensive evaluation |
|---|---|---|---|---|---|---|---|
| Comparative Example 2-1 | Production Example 2-1 | 0.04 | 60 | Poor | 37 | Poor | Poor |
| Example 2-1 | Production Example 2-2 | 0.08 | 300 | Good | 13 | Good | Excellent |
| Example 2-2 | Production Example 2-3 | 1.10 | 1500 | Good | 6 | Good | Excellent |
| Comparative Example 2-2 | Production Example 2-4 | 1.40 | 40 | Poor | 28 | Poor | Poor |

As shown in Table 2, the results found that even when different types of polyisocyanates were used to form the dielectric resin films, oxidation of the vapor-deposited electrodes was reduced or prevented and the ESR was less likely to increase even after long-term voltage application at a high temperature, as long as the dielectric resin films had a ratio of absorption peak intensity of the isocyanate group to absorption peak intensity of the carbonyl group (absorption peak intensity of isocyanate group/absorption peak intensity of carbonyl group) of 0.08 to 1.15.

The film capacitors according to Example 2-1 and Example 2-2 configured as described above each had a CR value of 250 $\Omega \cdot F$ or higher.

Example 3-4, two dielectric resin films each provided with a metal layer were prepared. These dielectric resin films were laminated while one of them was rotated 180 degrees about an axis in the lamination direction so that the insulating portions were alternately positioned. Then, these dielectric resin films were wound together to obtain a capacitor element. Zinc was thermally sprayed to the ends of the capacitor element to form external terminal electrodes. Lead wires were connected to the external terminal electrodes. The capacitor element was inserted into a PPS case, and the case was filled with an epoxy resin to enclose the capacitor element.

Film capacitors according to Comparative Example 3-1, Example 3-1, Example 3-2, and Comparative Example 3-2 were produced as described above.

The film capacitor according to Comparative Example 3-1 includes the dielectric resin films according to Production Example 3-1.

The film capacitor according to Example 3-1 includes the dielectric resin films according to Production Example 3-2.

The film capacitor according to Example 3-2 includes the dielectric resin films according to Production Example 3-3.

The film capacitor according to Comparative Example 3-2 includes the dielectric resin films according to Production Example 3-4.

The CR value and the rate of ESR increase of each film capacitor were measured similarly as in "Measurement of CR Value" and "Measurement of Rate of ESR Increase" described above. Table 3 shows the results.

number of moles of hydroxy groups in the bisphenol A phenoxy resin was substantially equal to the number of moles of isocyanate groups in the difunctional isocyanate. The mixture was thinly applied to a substrate film and dried to obtain a resin film as a dielectric resin film. Aluminum was vapor-deposited such that a strip-like insulating portion was formed on one edge of the dielectric resin film, whereby a metal layer was formed, followed by removal of the substrate and thermal curing. Thermal curing was performed at 150° C. for five hours. Thus, a 5-μm-thick dielectric resin film provided with a metal layer and having a ratio of absorption peak intensity of the isocyanate group to absorption peak intensity of the carbonyl group (absorption peak intensity of isocyanate group/absorption peak intensity of carbonyl group) of 0.2 was produced.

The absorption peak intensity of the carbonyl group and the absorption peak intensity of the isocyanate group were

TABLE 3

| | Type of dielectric resin film | Isocyanate group absorption peak intensity/carbonyl group absorption peak intensity | CR value ($\Omega \cdot F$.) | Evaluation of CR value | Rate of ESR increase (%) | Evaluation of Rate of ESR increase | Comprehensive evaluation |
|---|---|---|---|---|---|---|---|
| Comparative Example 3-1 | Production Example 3-1 | 0.05 | 10 | Poor | 58 | Poor | Poor |
| Example 3-1 | Production Example 3-2 | 0.08 | 250 | Good | 15 | Good | Excellent |
| Example 3-2 | Production Example 3-3 | 1.05 | 1500 | Good | 6 | Good | Excellent |
| Comparative Example 3-2 | Production Example 3-4 | 1.34 | 20 | Poor | 48 | Poor | Poor |

As shown in Table 3, the results found that in the dielectric resin films produced by mixing the first organic material and the second organic material such that the number of moles of isocyanate groups in the second organic material was higher than the number of moles of hydroxy groups in the first organic material, oxidation of the vapor-deposited electrodes was reduced or prevented and the ESR was less likely to increase even after long-term voltage application at a high temperature, as long as the dielectric resin films had a ratio of absorption peak intensity of the isocyanate group to absorption peak intensity of the carbonyl group (absorption peak intensity of isocyanate group/absorption peak intensity of carbonyl group) of 0.08 to 1.15.

The film capacitors according to Example 3-1 and Example 3-2 configured as described above each had a CR value of 250 Ω·F or higher.

The results found that the amount of isocyanate groups in the dielectric resin film can be easily adjusted as described above, when the first organic material and the second organic material were mixed by adjusting the ratio of moles in advance such that the number of moles of isocyanate groups in the second organic material was higher to a certain extent than the number of moles of hydroxy groups in the first organic material.

Example 4-1 to Example 4-4

A high molecular weight bisphenol A phenoxy resin and difunctional isocyanate (MDI) were mixed such that the measured similarly as in "Measurement of Functional Group Absorption Peak Intensity" described above.

Next, two dielectric resin films each provided with a metal layer were prepared. These dielectric resin films were laminated while one of them was rotated 180 degrees about an axis in the lamination direction so that the insulating portions were alternately positioned. Then, these dielectric resin films were wound together to obtain a capacitor element. Each capacitor element was either forcibly humidified in an atmosphere at 85° C. and a RH of 85%, not humidified, or dried by heating at 125° C. for 1 to 12 hours, whereby four types of capacitor elements were produced. The moisture content of each dielectric resin film is as shown in Table 4. The moisture content was measured by the hydride reaction method (ISO 15512:2019 as Method E).

Next, zinc was thermally sprayed to the ends of each capacitor element to form external terminal electrodes. Lead wires were connected to the external terminal electrodes. The capacitor element was inserted into a PPS case, and the case was filled with an epoxy resin to enclose the capacitor element.

Film capacitors according to Example 4-1 to Example 4-4 were produced as described above.

The CR value and the rate of ESR increase of each of the film capacitors according to Example 4-1 to Example 4-4 were measured similarly as in "Measurement of CR value" and "Measurement of Rate of ESR Increase" described above. Table 4 shows the results.

TABLE 4

|  | Moisture content (wt %) | CR value (Ω·F) | Evaluation of CR value | Rate of ESR increase (%) | Evaluation of Rate of ESR increase | Comprehensive evaluation |
|---|---|---|---|---|---|---|
| Example 4-1 | 0.01 | 5000 | Good | 4 | Good | Excellent |
| Example 4-2 | 0.07 | 1500 | Good | 6 | Good | Excellent |
| Example 4-3 | 0.40 | 300 | Good | 9 | Good | Excellent |
| Example 4-4 | 0.45 | 100 | Good | 14 | Good | Excellent |

As shown in Table 4, the results found that a lower moisture content of the dielectric resin film resulted in a lower rate of ESR increase and a higher CR value. In particular, the results found that the rate of ESR increase was particularly reduced when the moisture content is 0.4 wt % or less.

It is predictable that the moisture content can be further reduced by, for example, storing the film capacitor in a dry atmosphere or drying by heating before being enclosed.

REFERENCE SIGNS LIST 10 film capacitor
11 first metallized film
12 second metallized film
13 first dielectric resin film
13a first insulating portion
14 second dielectric resin film
14a second insulating portion
15 first metal layer
16 second metal layer
40 wound body of metallized films
41 first external terminal electrode
42 second external terminal electrode

The invention claimed is:

1. A film capacitor comprising:
a dielectric resin film made of a thermosetting urethane resin; and
a metal layer on at least one surface of the dielectric resin film,
wherein the dielectric resin film contains at least an isocyanate group and a carbonyl group, and
a ratio of a first absorption peak intensity of the isocyanate group in a wave number range of 2200 cm$^{-1}$ to 2350 cm$^{-1}$ to a second absorption peak intensity of the carbonyl group in a wave number range of 1650 cm$^{-1}$ to 1800 cm$^{-1}$ is 0.08 to 1.15.

2. The film capacitor according to claim 1, wherein the ratio of the first absorption peak intensity of the isocyanate group to the second absorption peak intensity of the carbonyl group is 0.1 to 1.0.

3. The film capacitor according to claim 1, wherein the ratio of the first absorption peak intensity of the isocyanate group to the second absorption peak intensity of the carbonyl group is 0.2 to 0.8.

4. The film capacitor according to claim 1, wherein the dielectric resin film has a moisture content of 0.4 wt % or less.

5. The film capacitor according to claim 4, wherein the moisture content is 0.01 wt % to 0.4 wt %.

6. The film capacitor according to claim 1, wherein the dielectric resin film is made of a cured product of a first organic material containing hydroxy groups and a second organic material containing isocyanate groups.

7. The film capacitor according to claim 6, wherein the first organic material is an organic polymer containing a hydroxyl group and a benzene ring in a repeating unit.

8. The film capacitor according to claim 7, wherein the organic polymer is a phenoxy resin.

9. The film capacitor according to claim 6, wherein the second organic material is one of diphenylmethane diisocyanate, tolylene diisocyanate, and hexamethylene diisocyanate.

10. The film capacitor according to claim 1, wherein the dielectric resin film includes a crosslinked product of a phenoxy resin and at least one of diphenylmethane diisocyanate or tolylene diisocyanate.

11. The film capacitor according to claim 1, wherein the film capacitor has a CR value of 250 Ω·F or higher, the CR value being a product of a capacitance of the film capacitor and an insulation resistance of the film capacitor measured after being left in an atmosphere at 125° C. for one hour and subsequently subjected to voltage application of 150 V/μm for one minute.

12. The film capacitor according to claim 11, wherein the CR value is 250 Ω·F to 5000 Ω·F.

* * * * *